United States Patent [19]

Herr et al.

[11] Patent Number: 4,495,430

[45] Date of Patent: Jan. 22, 1985

[54] BALANCED ARMATURE WINDING FOR MOTORS

[75] Inventors: John A. Herr, Garwood; Wolfgang Jaffe, Roselle Park, both of N.J.

[73] Assignee: The Singer Company, Stamford, Conn.

[21] Appl. No.: 51,333

[22] Filed: Jun. 22, 1979

[51] Int. Cl.³ .............................................. H02K 3/00
[52] U.S. Cl. ..................... 310/198; 310/208; 310/265
[58] Field of Search ............................. 310/198–208, 310/233, 234, 224–231, 261, 72, 264–267, 68 R

[56] References Cited

U.S. PATENT DOCUMENTS

| | | | |
|---|---|---|---|
| 1,519,861 | 12/1924 | McEldowney | 310/265 |
| 2,112,506 | 3/1938 | Schwarz | 310/206 |
| 2,152,327 | 3/1939 | Rauhut | 310/225 |
| 2,272,749 | 2/1942 | Lane | 310/206 |
| 2,504,537 | 4/1950 | Klima | 310/225 |
| 2,509,746 | 5/1950 | Thomas | 310/225 |
| 2,660,681 | 11/1953 | Horne | 310/208 |
| 2,668,926 | 2/1954 | Johnson | 310/225 |
| 3,535,573 | 10/1970 | Appleton | 310/234 |
| 4,063,123 | 12/1977 | Herr | 310/233 |

FOREIGN PATENT DOCUMENTS 539734  7/1955  Belgium .............................. 310/234

Primary Examiner—R. M. Skudy
Attorney, Agent, or Firm—David L. Davis; Robert E. Smith; Edward L. Bell

[57] ABSTRACT

The back EMF generated in armature coils is substantially balanced by causing the coils located a greater distance from the axis of rotation of the armature to have fewer turns than the coils located closer to the armature axis of rotation. Alternatively, rather than decrease the number of turns in the coils, the same balancing affect can be achieved by increasing the electrical resistance of the coils located a greater distance from the armature axis of rotation.

5 Claims, 3 Drawing Figures

BALANCED ARMATURE WINDING FOR MOTORS

DESCRIPTION

Background of the Invention

1. Field of the Invention

This invention relates to armature windings for an air gap motor and more particularly to such armature windings wherein the back EMF induced current in the various coils making up the winding is substantially the same in all of the coils regardless of their location on the armature.

2. Description of the Prior Art

Armature windings generally comprise a plurality of series connected coils of equal number of turns of insulation coated, electrically conductive wire. Since the average voltage generated in a coil turn is a function of the radius from the conductor to the axis of rotation of the armature, a conductor located closer to the armature axis of rotation generates only a fraction of the generated voltage of a conductor located closer to the periphery of the armature. Generally, the first coils are wound around the armature nearer to the armature axis of rotation than are the last coils which are located near the periphery of the armature. Accordingly the bottom or inner coils in an air gap motor armature generate less back EMF than do the outer coils thereby creating an armature voltage imbalance. This voltage imbalance not only reduces the efficiency of the motor by causing circulating losses in the armature winding but also causes arcing during commutation to decrease the life of the motor brushes and commutators.

Accordingly, one object of this invention is to provide an improved air gap motor armature winding that substantially eliminates these disadvantages associated with prior art armature windings.

Another object of this invention is to provide an improved armature winding wherein the back EMF induced in the armature coils is substantially balanced.

A further object of this invention is to provide an improved armature winding wherein the back EMF induced current in the armature coils is substantially balanced.

SUMMARY OF THE INVENTION

Briefly described, the present invention includes an armature for an electromechanical device, such as a single air gap motor, that includes a substantially cylindrical member having an axis of rotation along the length thereof. The cylindrical member includes a plurality of exterior slots along the length thereof in which electrically conductive wire is wound to form a plurality of coils. The coils located closer to the axis of rotation of the cylindrical member have a greater number of turns of the conductive wire than do the coils located a greater distance away from the axis of rotation of the cylinder with the number of turns of conductive wire in each coil being inversely proportional to the distance of the coil from the axis of rotation. In addition, all of the coils can be wound with the same number of turns of conductive wire but with the coils located closer to the axis of rotation having less electrical resistance than the coils located a greater distance from the axis of rotation. For this embodiment of the invention, the electrical resistance of the coils of the armature is proportional to the distance of the coil from the axis of rotation.

BRIEF DESCRIPTION OF THE DRAWINGS

The various features, objects and advantages of the present invention will be readily apparent from the following detailed description taken in conjunction with the following drawings, wherein like reference characters designate like or corresponding parts throughout the several views, and wherein.

DESCRIPTION OF THE INVENTION

Figure 1:
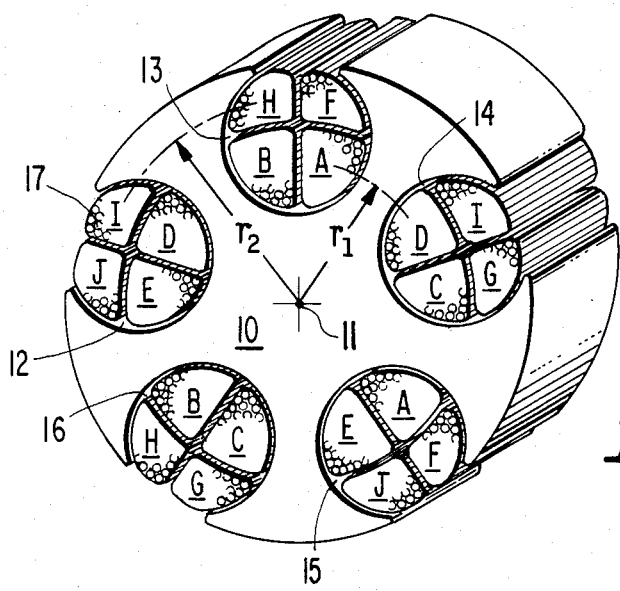
FIG. 1 illustrates a cross-sectional view of an air gap motor armature in accordance with the present invention.
Figure 2:
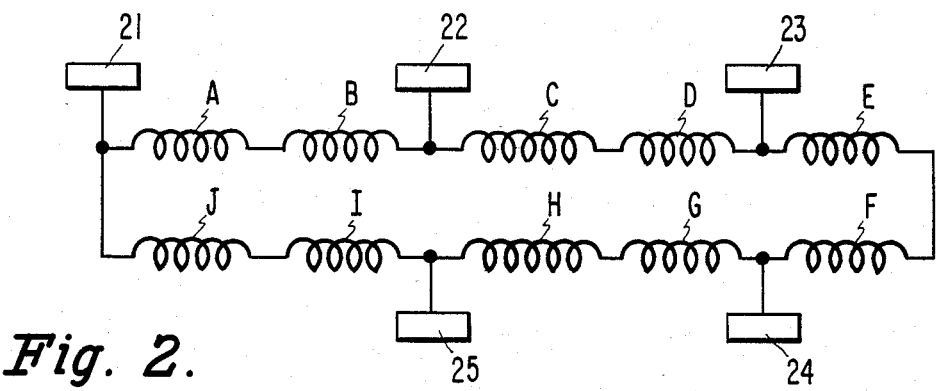
FIGS. 2 and 3 schematically illustrate the armature coils in accordance with separate embodiments of the present invention.

The present invention can be utilized in a single air gap motor armature such as that described in U.S. Pat. No. 4,063,123 the contents of which are incorporated herein by reference. The cross-section of an elongated cylindrical armature in accordance with the present invention is shown in FIG. 1 as including a core member 10 of nonferromagnetic material, such as plastic, having a plurality of exterior slots 12, 13, 14, 15 and 16 along the length thereof and an axis of rotation 11 along the length thereof. Insulated, electrically conductive wire 17 is wound through the slots 12, 13, 14, 15, and 16 in a well known manner to provide a plurality of armature coils (A, B), (C, D), (E, F), (G, H), (I and J). Coil sides A, B, C, D and E are inner coils located relatively near to the axis 11 of rotation of the cylindrical member 10 whereas coil sides F, G, H, I and J constitute outer coils located near the periphery of the member 10. Coils A–J are electrically connected in series as shown in FIG. 2 with the junction of coils A & J being connected to commutator bar 21, the junction of coils B and C being connected to commutator bar 22, the junction of coils D & E being connected to commutator bar 23, the junction of coils F & G being connected to a commutator bar 24 and the junction of coils H and I being connected to commutator bar 25.

The inner coils A thru E are located an average distance of $r_1$ from the axis 11 of rotation whereas the outer coils F thru J are located an average distance of $r_2$ from the axis of rotation. Since the conductors 17 of the outer coils F–J cut the motor magnetic field (not shown) at a greater arc of flux than do the conductors 17 of the inner coils A–E, the conductors 17 of the outer coils have a higher back EMF induced therein than do the inner coils with the resultant disadvantages discussed hereinabove. The back EMF induced in the outer coils F–J can be reduced by reducing the number of turns of conductor 17 therein in inverse proportion to the distance of the outer coils from the axis of rotation to substantially balance the back EMF in the inner A–E and outer F–J coils. This is so because the back EMF induced into a coil A–F is proportional to its distance from the axis of rotation 17. For example if the ratio of $r_1$ to $r_2$ is 0.75 the outer coils F–J would have seventy five percent of the turns of the inner coils A–E. Balancing the back EMF in this manner reduces arcing at the brushes (not shown) and commutator during commutation to prolong their useful life. The balanced back EMF also reduces circulating loses in the armature coils A–J.

Figure 3:
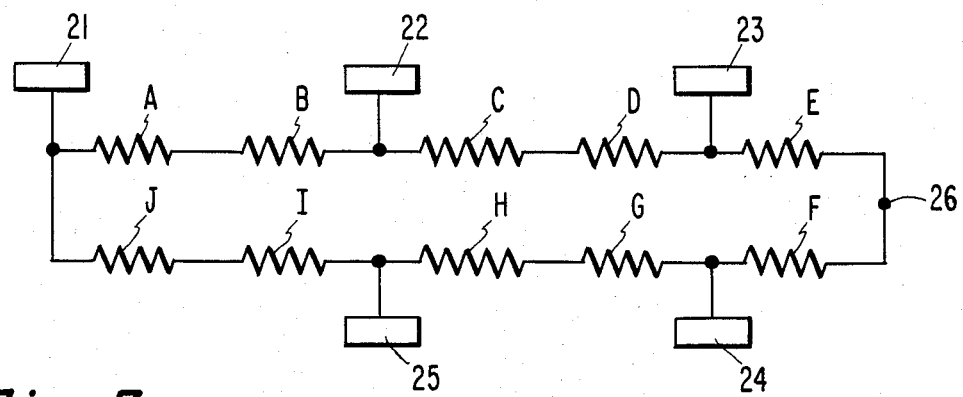

In addition to reducing the number of turns of the conductors 17 in the outer coils F–J, the power losses in the coils A–J can be balanced by increasing the resistance of the outer coils F–J with respect to the resistance of the inner coils A–E. This is accomplished by using a smaller diameter conductor 17 when winding the outer coils F–J. The resistance of the coils A–J for this embodiment of the present invention is proportional to their distance from the axis 11 of rotation. For example when the ratio of $r_1$ to $r_2$ is 0.75 the resistance of the conductor 17 forming the inner coils A–E is seventy five percent of the resistance of the outer coils F–J. This is accomplished in a manner as shown in FIG. 3 by first winding the inner coils A–E and then making a splice at 26 with the higher electrical resistive conductor 17 and then winding the outer coils F–J.

As will be apparent to those skilled in the art, there would be some inaccuracies in both embodiments of the present invention described hereinabove since the actual location of the coil A–J conductors 17 would not be theoretically perfect but would only be an approximation. However, the techniques described provide a substantial improvement over the prior art in balancing the back EMF and induced currents in an air gap motor armature.

The present invention was described in conjunction with an air gap motor armature having two layers of coils therein. As will be apparent to those skilled in the art, the present invention is equally applicable to motor armatures having more than two layers of coils.

Other embodiments and modifications of the present invention described herein will be apparent to those skilled in the art without departing from the spirit and scope of the invention as defined by the following claims.

We claim:

1. An armature for an electromechanical device comprising;
    a substantially cylindrical member having an axis of rotation along the length thereof,
    said cylindrical member including a plurality of exterior lengthwise slots,
    electrically conductive wire wound in said slots to form a plurality of serially connected coils,
    said coils located closer to the axis of rotation of said cylindrical member having a greater number of turns of said conductive wire than coils located a greater distance away from said axis of rotation.
2. The armature according to claim 1 wherein
    the number of turns of conductive wire in each of said coils is inversely proportional to the distance of said each of said coils from said axis of rotation.
3. An armature for an electromechanical device comprising;
    a substantially cylindrical member having an axis of rotation along the length thereof,
    said cylindrical member including a plurality of exterior lengthwise slots,
    electrically conductive wire wound in said slots to form a plurality of serially connected coils,
    said coils having substantially the same number of turns of said conductive wire,
    said coils located closer to the axis of rotation of said cylindrical member having less electrical resistance than coils located a greater distance away from said axis of rotation.
4. The armature according to claim 3 wherein the electrical resistance of the turns of conductive wire in said coils is proportional to the distance of the coil from said axis of rotation.
5. The armature according to claim 3 wherein;
    the electrical resistance of each of said coils is determined by the cross-section of the conductive wire forming said each of said coils and the number of turns of wire in said each of said coils.

* * * * *